(12) United States Patent
Wu et al.

(10) Patent No.: US 6,611,608 B1
(45) Date of Patent: Aug. 26, 2003

(54) HUMAN VISUAL MODEL FOR DATA HIDING

(75) Inventors: Min Wu, Princeton, NJ (US); Hong Heather Yu, Plainsboro, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/691,544

(22) Filed: Oct. 18, 2000

(51) Int. Cl.[7] ............................................... G06K 9/00
(52) U.S. Cl. ..................... 382/100; 713/176; 713/179
(58) Field of Search ............................ 382/100, 232; 380/54, 210, 252, 287, 51, 201; 348/461, 463, 460; 713/176, 179; 370/527, 528, 529

(56) References Cited

U.S. PATENT DOCUMENTS

| | | | | |
|---|---|---|---|---|
| 5,689,587 A | * | 11/1997 | Bender et al. | 382/232 |
| 5,862,260 A | | 1/1999 | Rhoads | |
| 6,031,914 A | * | 2/2000 | Tewfik et al. | 380/54 |
| 6,141,441 A | * | 10/2000 | Cass et al. | 382/166 |
| 6,154,571 A | * | 11/2000 | Cox et al. | 382/250 |
| 6,209,094 B1 | * | 3/2001 | Levine et al. | 713/176 |
| 6,285,775 B1 | | 9/2001 | Wu et al. | |
| 6,385,329 B1 | * | 5/2002 | Sharma et al. | 382/100 |
| 6,411,953 B1 | * | 6/2002 | Ganapathy et al. | 707/6 |

OTHER PUBLICATIONS

Podilchuk, Christine I., "Image–Adaptive Watermarking Using Visual Models", *IEEE Journal on Selected areas in communications*, vol. 16, No. 4, May 1998.

Dickinson, Bradley, "Adaptive Watermarking in the DCT Domain", *IEEE, 1997*.

* cited by examiner

*Primary Examiner*—Bhavesh M. Mehta
*Assistant Examiner*—Abolfazl Tabatabai
(74) *Attorney, Agent, or Firm*—Harness, Dickey & Pierce, PLC (57) ABSTRACT

A method and apparatus of hiding identification data in visual media. When image or video data is received, frequency masking is performed to divide the image or video data into blocks of smooth regions and blocks of non-smooth regions and to obtain preliminary just-noticeable-difference. Edge detection is performed to divide the non-smooth region of the image or video data into texture blocks and edge blocks. Then blocks of regions that are substantially proximate to blocks of smooth regions of the image or video data are determined. The image or video data is then adjusted by applying different strength of watermark in association with the type of each block.

17 Claims, 5 Drawing Sheets

HUMAN VISUAL MODEL FOR DATA HIDING

FIELD OF THE INVENTION

The present invention relates generally to data hiding techniques, and more particularly, to visual data hiding techniques for a refined human visual model.

BACKGROUND OF THE INVENTION

The escalating success of the Internet has allowed easy access to electronic data, which has also introduced problems regarding how to protect the electronic data. Many techniques have been proposed regarding the security issue over the last several years. One of these techniques introduces a digital watermarking of electronic data, which enables copyright protection of digital images. The digital watermarking technique, however, alters the perceived quality of electronic content. Therefore, it has been a challenging problem to properly reduce the watermark to protect the perceptual quality of the visual data while providing security. In particular, previous approaches tend to not be effective in eliminating or at least substantially reducing ringing effects on edges of image data.

Previous approaches utilize visual data hiding models to reduce the watermark to protect the perceptual quality of the image or video data. For example, Podilchuk-Zeng in *Image Adaptive Watermarking Using Visual Models*, IEEE Journal Selected Areas of Communication (JSAC), vol. 16, No. 4, May, 1998 discloses a frequency masking model for reducing artifacts appearing in the visual data. The method in Podilchuk-Zeng involves embedding the block discrete cosine transform (DCT) domain for image or video data and adjusting the watermark strength in each block based on the block-DCT domain frequency masking model. But they do not distinguish edge from texture. This leads to either ringing artifacts when work is strong or less robustness and less data hiding capacity when the strength of work is kept low to avoid artifacts. Tao-Dickinson in *Adaptive Watermarking in the DCT domain*, ICASSP 1997, proposed to apply block classification to reduce artifacts. Tao classifies image blocks into six categories, namely, edge uniform with moderate intensity, uniform with either high or low intensity, moderately busy, busy and very busy, in descending order of visual sensitivity against noise. Tao, then, respectively adjusts watermark strength in respectively ascending order. The Tao algorithm becomes rather complex as, for example, it enumerates various situations for horizontal edge, vertical edge, and diagonal edges across two regions of either uniform-texture or uniform-uniform and checks all the situations for each block. This approach suffers such disadvantages as (but not limited to) not being efficient in eliminating ringing effects on edges.

SUMMARY OF THE INVENTION

The present invention overcomes the aforementioned disadvantages and others. In accordance with the teaching of the present invention, the present invention receives an image or video file. The first step of the present invention is frequency masking wherein the image or video data is divided into blocks of smooth regions and blocks of non-smooth regions and preliminary just-noticeable difference of each frequency coefficient is obtained. The second step is edge detection wherein the non-smooth regions are divided into texture blocks and edge blocks. The third step is preferably used to determine which blocks of the regions are substantially proximate to blocks of smooth regions.

The image or video data is then adjusted by applying a different strength of watermark in association with the type of each block. Generally, a weaker strength of a watermark signal is applied to edge blocks than texture blocks. A weaker watermark signal is also applied to blocks that are adjacent to smooth regions. Thus, the present invention provides a more efficient and effective imperceptible data hiding method and apparatus that includes, but is not limited to, reducing ringing effects on edges that are very likely to be introduced by the conventional block DCT domain embedding approach for image and video.

DETAILED DESCRIPTION OF THE PREFERRED EMBODIMENT

Figure 1:
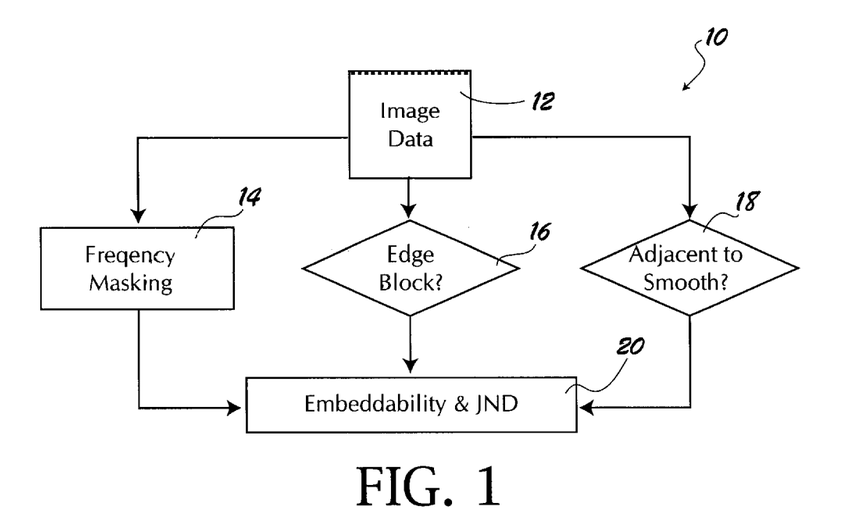
FIG. 1 is a flowchart depicting the top-level steps of the present invention.

FIG. 1 is a flowchart depicting the preferred three-step visual data hiding process 10 of the present invention. Process 10 hides identification data into visual media, such as image and video. Identification data includes a watermark signal and other similar types of signals that identify the contents of the image file, the owner, and other such information (e.g., copyright information). The preferred steps of Process 10 include a frequency domain masking step 14, edge-block detection step 16, and a step for identifying blocks adjacent to smooth region 18. Process steps 14, 16, and 18 analyze image data 12 with respect to three different block region types: a smooth block region, a texture block region, and an edge block region.

A smooth block region is defined as an uniform region with relatively low DCT coefficient values. A non-smooth block region is divided into a texture block region and an edge block region.

Undesirable artifacts are more likely to be revealed in an edge block than in a texture block due to the random artifacts tending to be disguised by a random structured pattern. Visual hiding process 10 then attenuates preliminary embeddability and just-noticeable-difference (JND) values via process 20 for each block which are computed during the aforementioned three steps 14, 16, and 18. Within the present invention, the term embeddability signifies a coefficient able to be changed by a certain amount (which is large enough to carry hidden data) without causing visible artifacts, and the term just-noticeable difference (JND) is the amount of changes performed on a coefficient which is just on the level to be noticed. The embeddability and JND values for each block are computed by the preliminary step, i.e., the frequency mask step which does not consider the ringing and/or other artifacts depending on the type of block region and are used to hide identification data.

Figure 2:
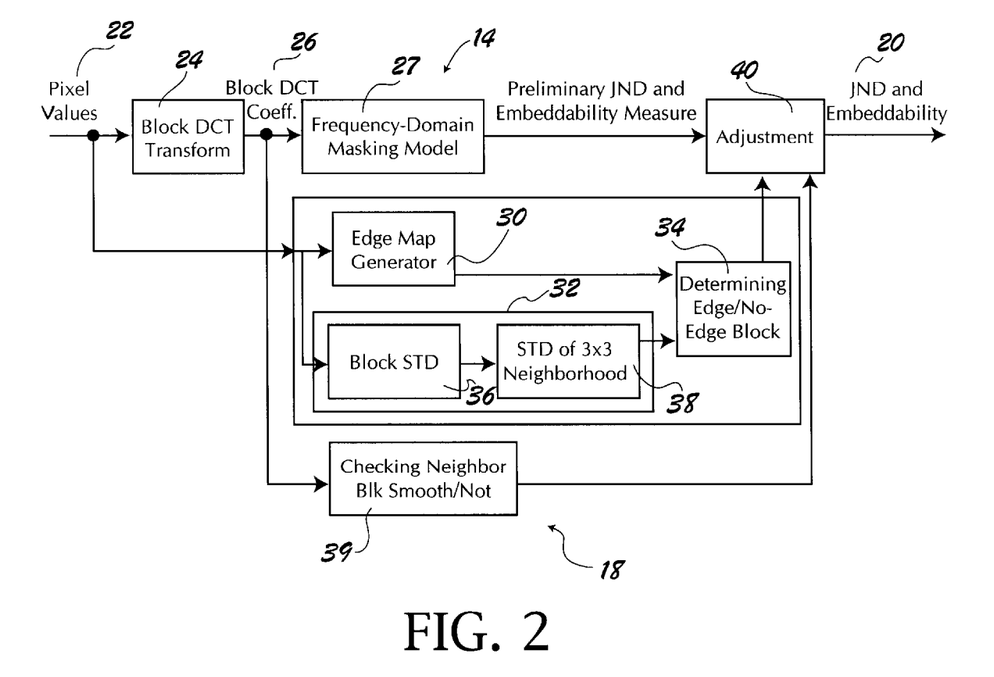
FIG. 2 is a block diagram depicting the software module architecture of the present invention.

FIG. 2 shows the computer-implemented components of process 10. When image data is received, it is divided into blocks containing a group of pixels. Each pixel has a pixel value 22 that represents the luminance or color of each pixel. The block discrete cosine transform (DCT) module 24 generates block DCT coefficients 26 for each block. DCT coefficients of each block are then used in the frequency domain masking module 27 to determine preliminary embeddability and JND values 28.

Next, the edge-block detection process 16 containing two modules 30 and 32 determines which blocks contain edges. The first module 30 generates an edge map using a conventional edge detection algorithm such as a Harr filtering algorithm or a Sobel filtering algorithm. These filtering algorithms are discussed generally in the following reference: A. K. Jain, "Fundamentals of digital image processing", Prentice Hall, 1989; "MATLAB Image Tool Box User's Guide", Mathworks, 1997. The result of module 30 may include many unwanted edges from texture regions, which are eliminated in module 34 when the edge map is combined with the result from the module 32.

Module 32 determines a double standard deviation (STD) measure using the pixel values. The block STD module 36 determines the standard deviation of pixel values within a predetermined block of pixels, which is then used to compute the standard deviation of the neighborhood blocks in neighborhood STD module 38.

The use of the double STD module 32 is in recognition that for a texture region, although the STD of each block is typically large, the STD of neighborhood blocks in the same texture region are similar. Thus, the double STD measure of a texture block region is relatively small. In contrast, the double STD of an edge block is likely to be very different from its neighborhood blocks, hence the double STD measure associated with an edge block is typically larger than that of a texture block region.

After module 38 has executed, the edge map generated by the first module 30 and the double STD measure from module 32 are combined in module 34 which outputs an edge measure for each block. The edge measure denotes whether there is an edge across the block and if so, how strong the edge is. The edge measure is used in the adjustment module 40 to help in determining the watermark strength that is to be applied to the coefficients of each block.

Block DCT coefficients 26 are also used in the step of identifying blocks adjacent to a smooth block in module 39. The artifacts by block DCT domain embedding are more visible in blocks that are adjacent a to smooth region than in other blocks even if the block contains a very weak edge or transition where the watermark may not be attenuated based on the results of the modules for the edge block detection step 16. For identifying what blocks are adjacent to a smooth region 18, smooth blocks are determined by the strength of AC (a non-zero frequency component) coefficient 66 of each block as generated by the block DCT module 24. DC coefficients are indicative of the mean or average luminance of a block. Then, blocks adjacent to a smooth block are detected in order to determine the watermark strength to be applied.

In the adjustment module 40, outputs from modules 27, 34 and 39 determine the watermark strength to be applied for each block of the image data. The preliminary embeddability and preliminary JND values 28 from the frequency masking module 27 are used as bases for the adjustment. The adjustment is based upon activeness of each block and its neighborhood block(s).

The term "activeness" is indicative of the perceptual sensitivity of a block, that is, it is indicative of how sensitive an image block is to reveal visible artifacts when noise is added to the block. A block that observes less perceptual sensitivity is considered to be more active. For example, smooth block is perceptually sensitive as little changes on it will be observable. Edge block is sensitive to noise that breaks the regularity and sharpness of the edge, for example, some ringing patterns around it introduced by noise on its frequency components. Texture block with random patterns is generally less sensitive to noise . . . i.e., an edge block or a smooth block is more sensitive to noise than a texture block. Thus, an edge block is considered to be less active than a texture block.

This sensitivity is taken into account in adjustment module 40 to adjust the preliminary JND 28 according to the smoothness and edginess measure computed by 34 and 39.

In the preferred embodiment of the present invention, the present invention considers edge blocks versus non-edge blocks.

Weaker watermark will be applied to perceptual sensitive blocks, i.e., non active blocks.

In the preferred embodiment, the weaker watermark will be applied to edge blocks than to texture blocks. The preliminary JND 28 of a block that is found to be adjacent to a smooth block in step 18 is decreased, thereby applying weaker watermarks to these blocks.

Figure 3:
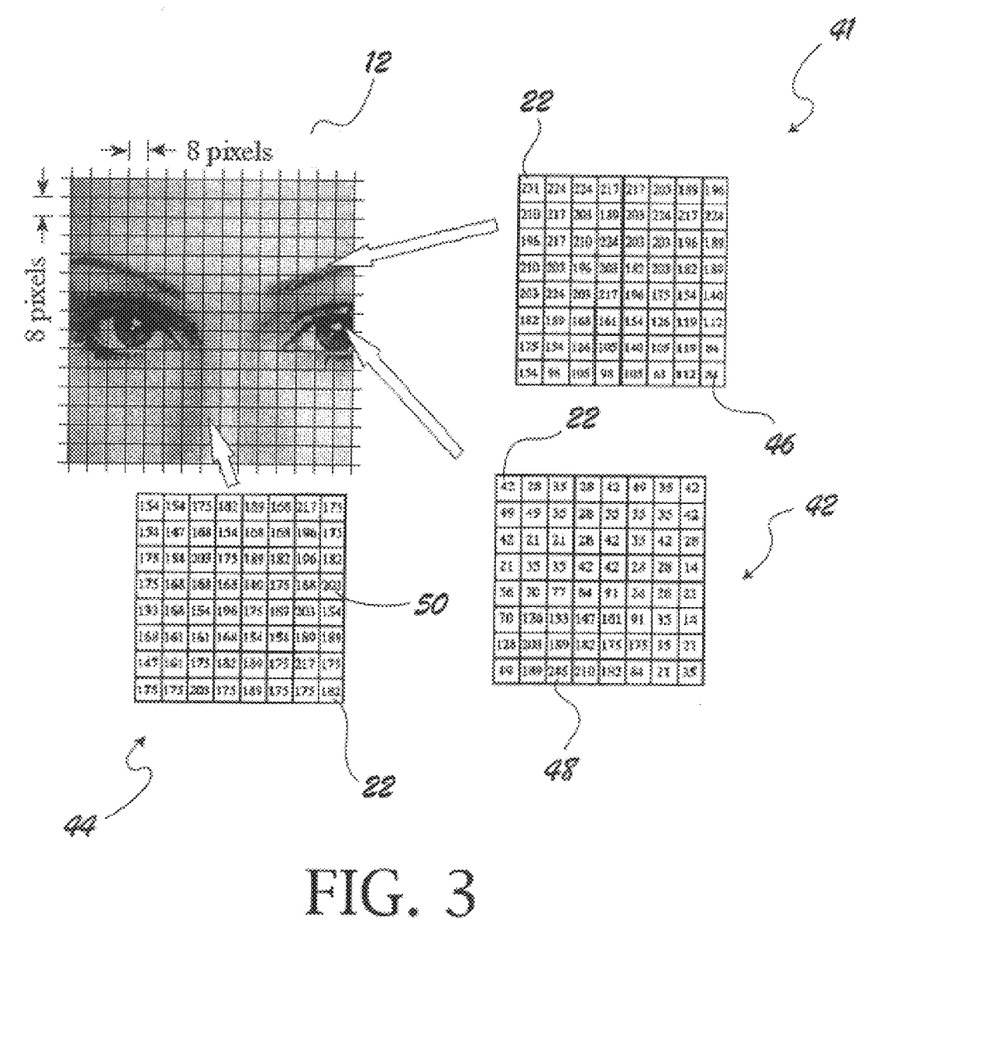
FIG. 3 is an exemplary image that has been divided into 8×8 pixel blocks.

With reference to FIG. 3, image data analysis is shown. When image data 12 is received, image data 12 is divided into blocks wherein each block such as 41, 42, and 44 contains a set of pixels indicated by reference numerals 46, 48, and 50. In the preferred embodiment, a block size of 8×8 is used. However, smaller block sizes such as 4×4 or other sizes can be used if that block size is too large to capture desired local features.

Three of these 8×8 blocks 41, 42, and 44 show the values of the individual pixel values 22. Pixel values 22 represent the activeness of each pixel block and it is typically represented by a single byte value between 0 and 255.

Figure 4:
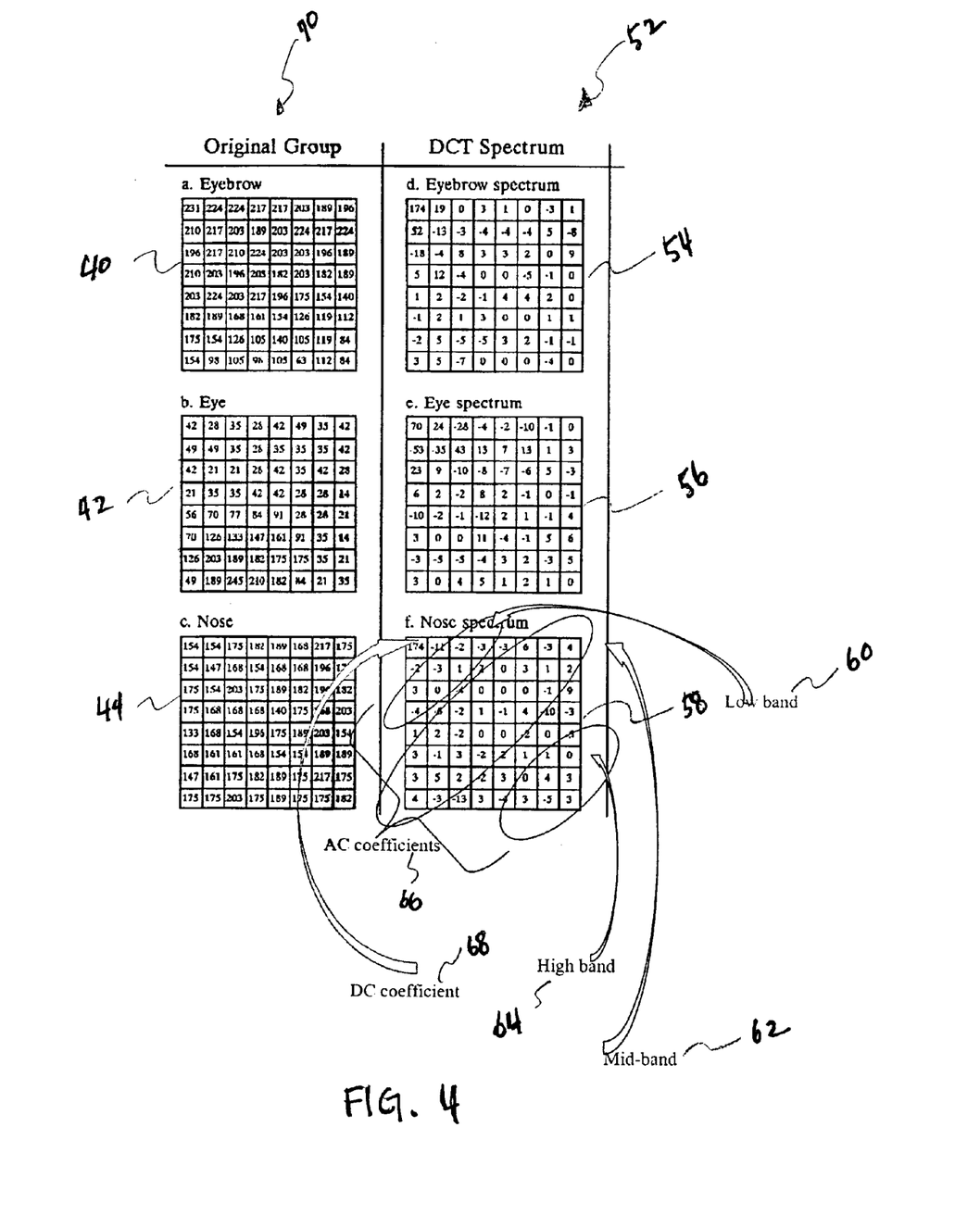
FIG. 4 is a representation of exemplary experimental results of block discrete cosine transform of 8×8 pixel blocks.

With reference to FIG. 4, exemplary results of the block DCT process are illustrated. The left column 70 represents 8×8 pixel values 22 of eyebrow block 41, eye block 42, and nose block 44 (that were shown in FIG. 3). The right column 52 depicts the DCT spectrum of these three blocks 54, 56, and 58 generated by block DCT transform module 24. As shown with reference to the nose block spectrum 58, each block is divided into a DC mean coefficient value 68 and an AC (non-zero frequency component) coefficient group 66. The AC coefficient group 66 is then further divided into a low-band region 60, a mid-band region 62, and a high-band region 64. The present invention preferably only considers the AC coefficient group 66 since manipulating DC coefficient value 68 in block DCT domain 24 generally introduces blocky artifacts especially in smooth regions.

Referring back to FIG. 2, the frequency masking step 27 of this preferred embodiment is similar to that proposed by the aforementioned Podilchuk-Zeng reference. During this frequency masking step 27, preliminary JNDs 28 are computed using a conventional block DCT algorithm 24 and preliminary embeddability 28 measures are determined based on preliminary JND 20 using frequency masking model 27. In Podilchuk-Zeng's frequency masking model, small coefficients are never modified to preserve invisibility. Similarly, in the preferred embodiment of the present invention, a coefficient with magnitude smaller than the preliminary JND 20 or the corresponding quantization step size of a JPEG quantization table is decided to be unembeddable. If all coefficients in a block are unembeddable, the block is labeled as a smooth block.

Still referring to FIG. 2, the edge-block detection step 16 combines the results of the double STD measures 32 and the edge map generator 30 in order to determine a quantitative value on how to adjust the preliminary JND based on the edge measure result 34.

In order to illustrate the adjustment module 40, the double STD measure from the module 32 is denoted as "blk_stdstd" and the edge map generated after the first module 30 is denoted as "origedg" which is normalized to 0~1. The larger the "origedg" is the more likely the corresponding pixel in the image is an edge.

In the preferred embodiment, the Harr filtering technique is used to generate the edge map. After one round of low pass filtering in both horizontal and vertical direction to remove some high frequency noise, a second round of filtering is performed and normalization is performed based on the maximum magnitude of HL (horizontally high frequency) and LH (vertically high frequency) is normalized to obtain the edge map "origedg." HL is HPF (high pass filter) in horizontal direction and LPF (low pass filter) in vertical direction similar for LH.

In the double STD module 32, STD refers to the standard deviation of a set of observations. The block STD 36 is computed using the following standard STD formulation:

$$s = \sqrt{\frac{1}{n-1}\sum_{i=1}^{n}(x_i - \bar{x})^2} \text{ where } \bar{x} = \frac{1}{n}\sum_{i=1}^{n}x_i,$$

wherein $x_i$ (i=1, . . . , n where n=64) represents the pixel values in each 8×8 block.

Next, the standard deviation of a 3×3 neighborhood is computed using the same formulation, where n is set to 9 and $x_i$ is the STD of each block in the 3×3 neighborhood:

(u−1, v−1) (u−1, v) (u−1, V+1)

(u, v−1) (u, v) (u, v+1)

(u+1, v−1) (u+1, v) (u+1, v+1)

When the double STD module 32 is done, a measure is computed to determine whether an edge is present in the current block or not, and if so, how strong the edge is in module 34. In this preferred embodiment an 8×8 size block is used to illustrate this computation, wherein the upper left-hand corner pixel is located at (i,j), with the following math formulation complaint with MATLAB syntax:

blk=8 x=origedg(i:(i+blk−1),j:(j+blk−1));

The term x represents an edge map which has a value for each pixel. However, since the preferred embodiment requires one measure for each block, a threshold "edg_thresh" is used for "blk_stdstd" to determine the presence of edge. If an edge is detected in the region, the strength of the edge is determined using both maximum and mean of "x":

orig_edgweight=(blk_stdstd(ceil(i/blk),ceil(j/blk))>edg_thresh)*(max(max(x))*0.8+mean(mean(x))*0.2);

wherein the constant edg_thresh preferably is the value 10. Most thresholds are determined through experiments on a small set of images roughly ranging between 5–10. However, each is quite representative of whether the block is either smooth or with lots of textures and whether the image contains some typical features such as edges, dark margins, and high contrast areas.

Finally, the weighting "orig_edgweight" is applied to adjust JND in module 40.

jnd(i:(i+blk−1),j:(j+blk−1))=round(jnd(i:(i+blk−1),j:(j+blk−1)).*(1−edge_factor1*orig_edgweight)

The edge_factor1 ranges preferably between 1.25~1.75 in the above formulation.

In step 18, blocks adjacent to smooth blocks are identified. If a block is adjacent to smooth blocks, JND in step 40 is determined according to the following formula:

jnd(i:(i+blk−1),j:(j+blk−1))=round(jnd(i:(i+blk−1),j:(j+blk−1)).*edge_factor2 wherein the range of edge_factor2 is preferably between 0.25~0.5 and the function "round" is the MATLAB round off function. MATLAB is available from The MathWorks, Inc.

In the preferred embodiment, it is possible to choose not to adjust the JND for very low frequency coefficients if they do not contribute to the high-frequency ringing effect.

Figure 5A:
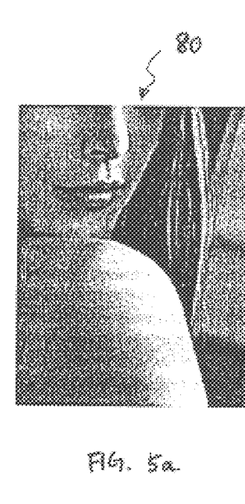
FIGS. 5a–5c are images of a Lenna image that compare the techniques of the present invention with the original image and a previous approach's treatment of the original image.
Figure 5B:
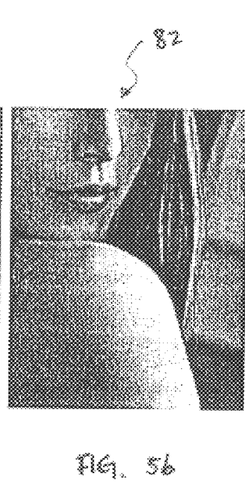
Figure 5C:
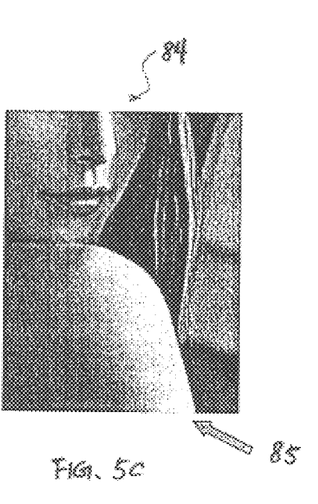
Figure 6A:
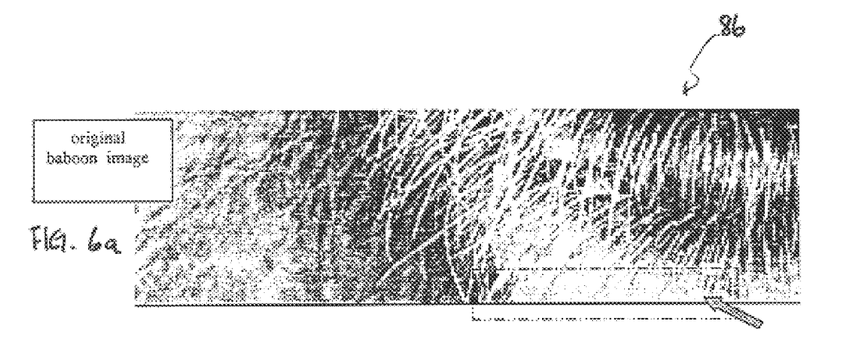
FIGS. 6a–6c are images of a baboon image that compare the techniques of the present invention with the original image and a previous approach's treatment of the original image.
Figure 6B:
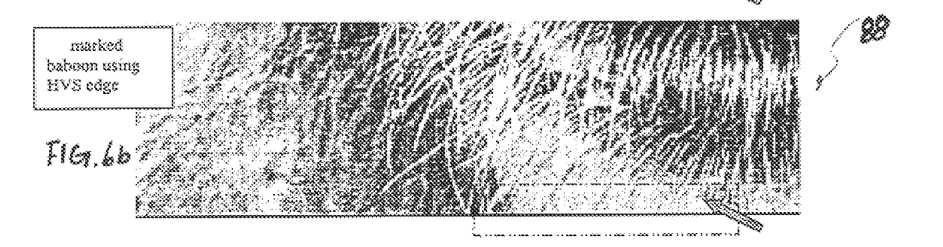
Figure 6C:
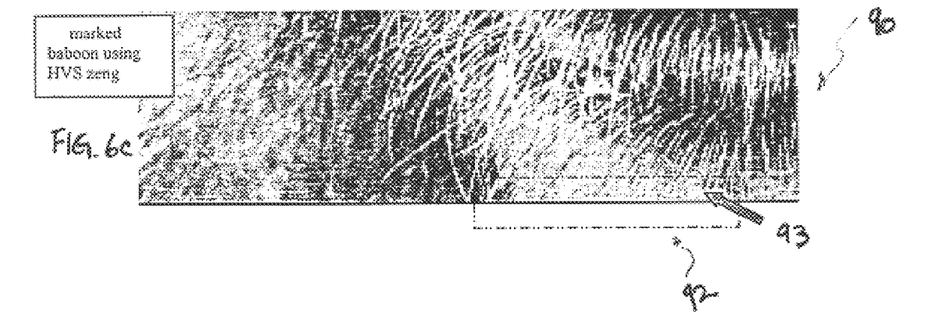

FIGS. 5a–5c and FIGS. 6a–6c demonstrate the difference between applying the frequency masking step only which is denoted as "HVS zeng" and the process of the present invention which is denoted as "HVS edge". Original "Lenna" image 80 is shown in FIG. 5a as containing many smooth regions and sharp edges. In FIG. 6a, original "Baboon" image 86 contains many textures and also a dark border at its bottom. The image quality and detection statistics of single spread-spectrum watermark are summarized in the table below. In this table, other parameters such as scaling factor for watermark strength before any adjustment are same. The following table shows that the present invention contains fewer artifacts.

| Image | HVS type | Detection statistics | PSNR (dB) | Subjective image quality |
|---|---|---|---|---|
| Lenna Image 80 (512 × 512) | HVS edge 82 | 25.50 | 42.51 | good image quality |
| | HVS zeng 84 | 35.96 | 40.76 | artifacts along edges (e.g., shoulder) |
| Baboon Image 86 (512 × 512) | HVS edge 88 | 58.49 | 33.59 | good image quality |
| | HVS zeng 90 | 62.81 | 33.10 | obvious artifacts along bottom dark border |

In FIG. 5c, the HVS zeng image 84 shows artifacts 85 along Lenna's shoulder line which is a sharp edge and also adjacent to smooth region. The present invention eliminates these artifacts of HVS zeng image 84 as shown in image 82 in FIG. 5b. Similarly, in FIG. 6c, the HVS zeng image of "Baboon" 90 contains artifacts along the bottom border which are enclosed in a rectangle 92, and more specifically shown by reference numeral 93. Image 88 of the present invention in FIG. 6b does not show these artifacts at reference numeral 93 since the present invention is capable of eliminating ringing artifacts near an edge.

The invention being thus described, it will be obvious that the same may be varied in many ways. Such variations are not to be regarded as a departure from the spirit and scope of the invention, and all such modification as would be obvious to one skilled in the art are intended to be indicated within the scope of the following claims. Moreover, various other advantages of the present invention will become apparent to those skilled in the art after having the benefit of studying the foregoing text and drawings taken in conjunction with the following claims.

The invention claimed is:

1. A method for hiding identification data in visual medium file, comprising the steps of:
   receiving a visual medium file that includes blocks of smooth regions and blocks of non-smooth regions;
   determining which blocks of the regions are substantially proximate to blocks of the smooth regions; and
   adjusting the signal strength amount of the identification data stored in association with a first block from the visual medium file, said adjusting to the first block being based upon whether the first block is determined to be substantially proximate to a block that is from a smooth region.

2. The method of claim 1 further comprising the step of adjusting the amount of the identification data stored with blocks substantially proximate to smooth blocks, said adjusting being based on the intensity difference between the proximate blocks and their respective smooth block.

3. The method of claim 1 further comprising the steps of:
   determining a preliminary perceptibility measurement that is indicative of the visual perceptibility resulting from storage of the identification data in the visual medium file;
   adjusting the preliminary perceptibility measurement of the identification data stored in association with the first block from the visual medium file, said adjusting to the preliminary perceptibility measurement being based upon whether the first block is determined to be substantially proximate to a block that is from a smooth region; and
   using the final adjusted perceptibility measurement to determine how much of the identification data is embedded with at least one of the blocks of the visual medium file.

4. The method of claim 1 further comprising the steps of:
   determining a preliminary just-noticeable-difference measurement that is indicative of the visual perceptibility resulting from storage of the identification data in the visual medium file;
   adjusting the preliminary just-noticeable-difference measurement of the identification data stored in association with the first block from the visual medium file, said adjusting to the just-noticeable-difference measurement being based upon whether the first block is determined to be substantially proximate to a block that is from a smooth region; and
   using the final, adjusted just-noticeable-difference measurement to determine how much of the identification data is embedded with at least one of the blocks of the visual medium file.

5. The method of claim 4 further comprising the step of generating the preliminary just-noticeable-difference measurement via a frequency-domain masking model.

6. The method of claim 4 further comprising the steps of:
   determining block DCT coefficients based upon pixel values associated with the blocks; and
   using a frequency-domain masking model to generate the preliminary just-noticeable-difference measurement based upon the determined block DCT coefficients.

7. The method of claim 1 further comprising the step of reducing the amount of identification data embedded in a block based upon whether the block is a boundary block between a smooth region and another region.

8. The method of claim 1 wherein a block includes pixel values, said method further comprising the steps of:
   determining first variation metrics associated with the pixel values in a block;
   determining neighborhoods of blocks; and
   determining a second variation metric indicative of the variation within a given neighborhood using the first variation metrics of the blocks in the given neighborhood.

9. The method of claim 1 wherein a block includes pixel values, said method further comprising the steps of:
   determining first standard deviation associated with the pixel values in a block;
   determining neighborhoods of blocks; and
   determining a second standard deviation indicative of the variation within a given neighborhood using the first standard deviations of the blocks in the given neighborhood.

10. The method of claim 9 further comprising the steps of:
    generating an edge map; and
    determining whether an edge exists based upon the generated edge map and the second standard deviation.

11. A method for hiding identification data in a visual medium file, comprising the steps of:
    receiving a visual medium file;
    determining from said visual medium file at least one first block and at least one neighboring block which is in the proximity of said first block;
    determining a degree of activeness metric for said first block and said neighboring block, wherein the degree of activeness indicates perceptual sensitivity of a given block and a tendency of said given block to reveal visible artifacts when noise is added to the block; and
    adjusting the amount of the identification data stored in association with said first block based upon the degree of activeness of said first block and upon the degree of activeness of said neighboring block to more effectively hide the identification data in the visual medium file.

12. The method of claim 11 wherein the activeness of the first block is indicative of the edginess of the first block.

13. The method of claim 11 further comprising the step of:
    determining activeness of at least one of the blocks based upon the pattern revealed by high frequency components of the block and its neighboring blocks.

14. A method for hiding identification data in a visual medium, comprising the steps of:
    receiving a visual medium file;
    determining blocks of regions within said visual medium file, wherein a type of a given block is selected from smooth blocks, texture blocks and edge blocks;
    determining preliminary embeddability measure and preliminary just-noticeable difference measure of said blocks;
    determining at least one neighbor block that is substantially proximate to a given one of said smooth blocks; and
    adjusting the signal strength amount of the identification data stored in association with a first block from the visual medium file, said adjusting to the first block being based on said preliminary embeddability measure, said preliminary just-noticeable difference measure and said type of said neighbor block.

15. The method of claim 14 further comprising the step of:

determining which of said blocks are of the type of said edge blocks.

16. The method of claim 15 wherein said step of adjusting applying a weaker strength of identification data to said block if said block is of the type of said edge block in compared to identification data applied to a given block of the type of said texture block.

17. The method of claim 14 wherein said identification data is a watermark.

* * * * *